United States Patent [19]

Farrar

[11] 4,145,498

[45] * Mar. 20, 1979

[54] ADDITION OF COUPLING AGENT DURING ORGANOLITHIUM INITIATED POLYMERIZATIONS

[75] Inventor: Ralph C. Farrar, Bartlesville, Okla.

[73] Assignee: Phillips Petroleum Company, Bartlesville, Okla.

[*] Notice: The portion of the term of this patent subsequent to Apr. 26, 1994, has been disclaimed.

[21] Appl. No.: 762,691

[22] Filed: Jan. 26, 1977

Related U.S. Application Data

[60] Division of Ser. No. 447,203, Mar. 1, 1974, Pat. No. 4,020,258, which is a continuation of Ser. No. 195,810, Nov. 4, 1971, abandoned.

[51] Int. Cl.$^2$ .............................. C08F 4/08; C08F 4/16; C08F 36/06; C08F 36/08

[52] U.S. Cl. .................................... 526/178; 526/176; 526/180; 526/181; 526/335; 526/340; 526/919

[58] Field of Search ................ 526/173, 176, 178, 180

[56] References Cited

U.S. PATENT DOCUMENTS

| | | | |
|---|---|---|---|
| 3,595,941 | 7/1971 | Farrar | 260/879 |
| 3,624,057 | 11/1971 | Farrar | 526/340 X |
| 3,651,025 | 3/1972 | Bean, Jr. | 526/47 X |
| 3,652,516 | 3/1972 | Farrar | 526/181 X |
| 3,776,893 | 12/1973 | Naylor | 526/180 |

*Primary Examiner*—C. A. Henderson

[57] ABSTRACT

Continuous or incremental addition of a coupling agent, such as silicon tetrachloride, during the polymerization step of organolithium initiated polymerization processes results in polymers of improved processability, as well as other improved properties such as high green strength, low die swell, and minimal shrinkage on extrusion.

26 Claims, No Drawings

ADDITION OF COUPLING AGENT DURING ORGANOLITHIUM INITIATED POLYMERIZATIONS

This is a divisional application of Ser. No. 447,203 filed Mar. 1, 1974, now U.S. Pat. No. 4,020,258, issued Apr. 26, 1977 which is a continuation application of Ser. No. 195,810 filed Nov. 4, 1971, now abandoned.

FIELD OF THE INVENTION

This invention relates to the preparation of conjugated diene polymers.

In another aspect, the invention relates to a manner of modifying a polymerization process utilizing organolithium initiators.

BACKGROUND OF THE INVENTION

Numerous studies have been made in an effort to improve the processability of the broad class of polymers of conjugated dienes, particularly the solution polymerized polymers. In general, a broader molecular weight distribution is desired in polymers of conjugated dienes including homopolymers of conjugated dienes, copolymers of conjugated dienes, and copolymers of conjugated dienes with monovinyl-substituted aromatic compounds. Polymers of broader molecular weight distribution tend to have more desirable processing characteristics such as better banding on a roll mill, faster and better mixing of compound recipes in an internal mixer, reduced cold flow, as compared to polymers with relatively narrow molecular weight distribution. Improved processability characteristics of solution-polymerized polymers are desired so as to be equivalent to the processability of the emulsion-polymerized polymers. The emulsion-polymerized polymers are more difficult and expensive to make. Improving the properties of the more easily and economically prepared solution-polymerized polymers would improve the competitive position of the latter.

SUMMARY OF THE INVENTION

The continuous or incremental additions of nonpolymerizable coupling agents, such as of the silicon tetrahalides and the like, during at least a portion of the course of the polymerization step of polymerizations after initiation with organolithium initiators results in polymeric products of much improved processability characteristics as compared to similar polymers made by conventional methods. My invention is applicable to polymerization of monomers which are polymerizable with organolithium initiators.

The improved polymers not only provide better milling of the rubbery polymers, but the polymers produced according to my invention also exhibit significantly high and desirable green strength, low die swell, low shrinkage on extrusion, all characteristics quite valuable in rubbery product utilizations. Another characteristic of polymers of my invention are the generally low viscosities of solutions of polymers of conjugated dienes in hydrocarbons such as styrene. These solutions are useful in the manufacture of high impact polystyrene, and low solution viscosity is an advantage in the manufacture thereof.

DETAILED DESCRIPTION OF THE INVENTION

Coupling Agents

My invention is broadly concerned with what I term the essentially continuous addition of non-polymerizable coupling agents during at least a portion of the polymerization of the monomer or monomers in the polymerization system, commencing after polymerization of the monomers has been initiated in the polymerization system. The term "essentially continuous" is intended to include incremental addition or the addition of discrete portions of the non-polymerizable coupling agent separated by discrete intervals of time. Suitable coupling reagents are those which can be broadly termed the non-polymerizable coupling agents.

Suitable agents can be represented by the general formula $R_aMZ_b$ in which R is a hydrocarbyl radical, preferably alkyl, cycloalkyl, aryl, or hydrogen having from 1 to 20 carbon atoms; M is silicon or tin; Z is halogen, or —Or; b is an integer of from 2 to 4; a is zero, 1, or 2; and the sum of a plus b is equal to 4. The halogen can be fluorine, chlorine, bromine, or iodine. Suitable examples of these coupling agents include silicon tetrahalide, stannic chloride, tetraethylorthosilicate, tetraethoxytin, dimethyldichlorosilane, methyltrichlorosilane, trichlorosilane, methyldichlorosilane, phenyltrimethoxysilane, and the like. Those compounds in which b is less than 4 are presently considered to be especially suited for polymerizations initiated with multilithium initiators.

Another class of suitable coupling agents are the disilanes which can be represented by the general formula $R_cZ_dSiSiZ_dR_c$ wherein R and Z are each as defined hereinabove; c is zero or an integer of 1 to 2; d is an integer of 1 to 3; and the sum of c + d is equal to 3. These disilane coupling agents include hexahalosilanes such as hexachlorodisilane, or any other of the disilanes containing at least two reactive groups as described and exemplified for the silanes.

It is also within the scope of this invention to employ mixtures of any of the above suitable coupling agents.

The amount of suitable coupling agent defined above which can be employed according to my invention can be expressed in terms of the ratio of equivalents of the group Z in the coupling agent to lithium in the initiator employed. Broadly, this ratio of equivalents of Z in the coupling agent to lithium in the initiator is in the range of from 0.01:1 to 1.5:1, preferably 0.25:1 to 1.25:1.

Those coupling agents in which Z is halogen are not considered to be suitable for polymerization systems where random copolymers of conjugated dienes and vinyl aromatic hydrocarbons are prepared in the presence of randomizing agents such as potassium alkoxides and the like. However, types of randomizing agents such as ethers, thioethers and tertiary amines, do not render such coupling agents in which Z is halogen unsuitable for said copolymerizations. If copolymerizations randomized with such as potassium alkoxides are conducted according to this invention, compounds wherein Z is —OR should be employed.

The coupling agent is added in the process of my invention essentially continuously to the polymerization system, commencing after polymerization has started. The addition can be conducted substantially over any portion of the course of the polymerization reaction, commencing after polymerization of the monomers has been initiated by the organolithium initiator. Broadly, the addition of the polymerizable coupling agent can be commenced from a degree of conversion of about 3 percent up to and including essentially quantitative conversion of monomers. The addition can be ceased at or after essentially complete conversion of monomers, or at any time prior thereto. It is presently preferred that the addition be from about 3 percent conversion up to about 75 percent conversion of monomers to polymer, and more preferably from about 3 percent up to about 30 percent conversion of monomers to polymer. Broadly, it is presently preferred that the addition of the coupling agent to the polymerization mixture be started before at least about 30 percent conversion of monomers to polymer has been obtained. It is to be realized that intervals to achieve such conversions when expressed in terms of elapsed time may, under some conditions, be of short duration, since, for example, at high catalyst levels and high polymerization temperatures, the polymerization rate may be quite rapid. On the other hand, if the polymerization rate is decreased such as by decreasing the polymerization temperature and/or catalyst level, the duration of time employed in the essentially continuous addition of the polymerizable coupling agent may range up to several hours.

A feature of my invention lies in the ability to control the molecular weight of the final product by timing the start of the coupling agent addition. That is, the final molecular weight of the polymer can be adjusted by proper selection of the time period between the start of polymerization and the start of the coupling agent addition. For example, the longer the delay in the start of the coupling agent addition after the polymerization has been initiated, the lower will be the molecular weight of the polymer. Employing usual amounts of initiator and polymerization temperatures, polymers in a desirable processable Mooney viscosity range can be obtained when a delay in the addition of from 15 up to 30 seconds is employed after initiation is commenced before the start of the addition of the non-polymerizable coupling agent.

POLYMERIZATION SYSTEMS

My invention is applicable to the polymerization of monomers which are polymerizable with organolithium initiators.

This invention is believed to be particularly valuable for the production of rubbery homopolymers such as polybutadiene or butadiene/styrene copolymers in the normally solid rubbery range, i.e. having a butadiene/styrene ratio of about 60/40 to about 99/1 However, other ratios of monomers may, of course, be employed in preparing copolymers according to this invention.

The monomers which can be employed in a process according to my invention are those known to polymerize with lithium initiator systems. Such monomers include the particularly useful conjugated dienes of from 4 to 12 carbon atoms per molecule, presently preferred being those of from 4 to 8 carbon atoms per molecule for commercial availability, and also the monovinyl-substituted aromatic compounds of from 8 to 20 carbon atoms per molecule, presently preferred being those of from 8 to 12 carbon atoms per molecule since more readily commercially available. In general, I term the polymer products of my invention to be polymers of conjugated diene, which term is intended to include homopolymers of any one conjugated diene, copolymers of any two or more conjugated dienes, and copolymers of one or more conjugated dienes with one or more monovinyl-substituted aromatic compounds.

Examples of suitable monomers include the presently preferred 1,3-butadiene, isoprene, and styrene; as well as 2,3-dimethyl-1,3-butadiene, piperylene, 3-butyl-1,3-octadiene, 2-phenyl-1,3-butadiene, 1-vinylnaphthalene, 3-methylstyrene, 4-cyclohexylstyrene, 4-dodecylstyrene, 2-ethyl-4-benzylstyrene, 4-tert-butylstyrene, 4-isopropylstyrene, and the like. Mixtures of two or more monomers can be employed. Furthermore, the monomers can be added together, or in sequential addition and hence sequential polymerization of different monomers also can be utilized according to the process of my invention.

ORGANOLITHIUM INITIATORS

The process of my invention is broadly applicable to any of the organolithium polymerization initiator systems known in the art to polymerize a polymerizable monomer I have described above.

The term "organolithium initiators" is used in a broad sense to indicate any of the initiators which include one or more lithium atoms and one or more organic moieties, whether as organolithium compounds, organolithium adducts, multilithium initiators, and other more or less descriptive terms.

Organolithium polymerization initiators useful in the context of my invention include those which can be represented by the formula $R'Li_y$ wherein $R'$ is a hydrocarbyl radical having a valence equal to the value of y, with y being an integer of from 1 to 4. The hydrocarbyl radical $R'$ generally is limited to about 20 carbon atoms in practice, although higher molecular weight compounds can be utilized. Exemplary initiators include methyllithium, n-butyllithium, sec-butyllithium, n-decyllithium, phenyllithium, 1-naphthyllithium, p-tolyllithium, cyclohexyllithium, and others known to the art wherein $R'$ is an aliphatic, cycloaliphatic, aromatic, or combination radical with a suitable valence and lithium is substituted in from 1 to 4 positions as indicated by the general formula.

Adducts of lithium metal with condensed ring aromatic hydrocarbons such as naphthalene, anthracene, and the like, are suitable initiators. As is known in the lithium initiator art, such adducts can be solubilized if desired, with the use of a small amount of a polymerizable monomer in their preparation.

Various reaction products of organomonolithium compounds with compounds such as the polyvinyl-substituted aromatic compounds such as divinylbenzene, substituted vinyl products such as diisopropenylbenzene, and with various polyvinyl-substituted compounds of silicon or phosphorus such as tetravinylsilane or trivinylphosphine, can be utilized. These initiators can be solubilized if desired by the use of a small amount of a polymerizable monomer by contacting therewith the complex initiator so formed or prepared. Presently preferred are initiators formed from such as n-butyllithium and divinylbenzene.

In order to obtain the advantages of this invention, it may be necessary to employ slightly higher levels of initiator than those conventionally employed in polymerizations with organolithium initiators in the preparation of normally solid rubbery polymers. Broadly, the amount of initiator employed according to this invention can range from about 0.2 to 100 milliequivalents of lithium in the initiator, presently preferably from 0.5 to 15, milliequivalents of lithium in the initiator per hundred grams of monomer employed.

POLYMERIZATION CONDITIONS

Polymerization conditions such as temperatures and times are those conventionally employed in the art. Pressures employed are those sufficient to maintain the polymerization mixture in the liquid phase. Diluents are generally employed as is known in the prior art in polymerizations employing organolithium initiators. Suitable diluents include hydrocarbons having from 4 to 12 carbon atoms per molecule such as n-butane, n-hexane, n-octane, n-dodecane, toluene, benzene, cyclohexane and the like. Mixtures of said suitable diluents can be employed if so desired. Copolymerizations, as indicated above, may be carried out in the presence of compounds known to be randomizers. These compounds are polar materials which have been mentioned earlier such as ethers, thioethers, and tertiary amines along with the alkali metal alkoxides such as potassium alkoxide or other similar compounds known in the prior art.

Typical polymerization reaction conditions can include any condition generally known to the art for polymerization of monomers as described with initiators as described. For example, and illustrative only, are polymerization temperatures varying over a broad range which is generally from about $-100°$ to $+300°$ F., from a polymerization time of a few minutes to upwards of 48 hours or more as may be desired or convenient for commercial practice.

Recovery of the polymer from polymerization mixtures of this invention is also by conventional processes. The polymerization is generally terminated or short-stopped with a material which inactivates or destroys the organolithium initiator such as alcohols or acids, water and the like. The polymerization mixture is then generally admixed with a stabilizer, e.g., antioxidants and the like. The polymer, having stabilizer incorporated therein, is then recovered by conventional means such as steam stripping of the polymerization mixture or coagulation of the polymer solution with a non-solvent such as isopropyl alcohol.

Shown below in Table I is a list of presently preferred polymerization systems in which my invention provides polymers of improved processability.

Table I

| Initiator | Monomer(s) | Coupling Agent | Randomizer |
|---|---|---|---|
| n-Butyllithium | Butadiene/Styrene | Silicon tetrachloride | Tetrahydrofuran |
| n-Butyllithium | Butadiene/Styrene | Tetraethylorthosilicate | Tetrahydrofuran |
| n-Butyllithium | Butadiene/Styrene | Stannic chloride | Tetrahydrofuran |
| n-Butyllithium | Butadiene | Silicon tetrachloride | None |
| Multilithium[a] | Butadiene | Silicon tetrachloride | None |
| Multilithium[a] | Butadiene/Styrene | Silicon tetrachloride | Tetrahydrofuran |
| Multilithium[a] | Butadiene/Styrene | Tetraethylorthosilicate | Potassium-tertiary-amyloxide |
| Multilithium[a] | Isoprene/Styrene | Silicon tetrachloride | Tetrahydrofuran |
| Multilithium[a] | Isoprene/Styrene | Tetraethylorthosilicate | Potassium-tertiary-amyloxide |

[a]Prepared from such as n-butyllithium and divinylbenzene.

EXAMPLES

The following examples are intended to be illustrative of my invention, particular species employed, particular reaction conditions, particular ratios, are to be considered as illustrative and not as limitative of the scope of my invention.

EXAMPLE I

Butadiene and styrene were used to prepare a series of copolymers according to the following recipe:

| Polymerization Recipe | |
|---|---|
| | Parts, by wt. or (mhm) |
| 1,3-Butadiene | 75 |
| Styrene | 25 |
| Cyclohexane | 760 |
| Tetrahydrofuran (THF) | 1.5 |
| n-Butyllithium, mhm | (2.0) |
| Silicon Tetrachloride (SiCl$_4$) | (0.525) |
| Temperature, °C[a] | 70–101 |
| Time, minutes | 10–15 |

[a]Initiation temperature to peak temperature.
Charge Orders:
Cyclohexane, N$_2$ purge, butadiene, styrene, THF, heat to initiation temperature (70° C), n-BuLi, SiCl$_4$ added continuously over a 1.0 minute period after a delay of 0.25 minute following the n-BuLi addition.

At the end of the polymerization period the polymer from each run was isolated by steam stripping in the presence of 0.5 part by weight per 100 parts by weight of monomers of an antioxidant, 2,2'-methylenebis(4-methyl-6-tert-butylphenol).

Run A: Six polymers were obtained using the above recipe. These exhibited Mooney viscosities in the range of 114 to 125 ML-4 at 212° F. The polymers from these runs were dissolved in cyclohexane, mixed with 37.5 parts by weight of extender oil (Philrich* 5) and the solutions combined. The combined oil-rubber solution then was steam stripped to recover the oil extended polymer.
*Trademark Run B: Another run was made utilizing the same polymerization recipe as described above, the same Si:Li stoichiometry, and the same catalyst level as shown in the recipe. However, in this control run, a nonpolymerizable coupling agent, silicon tetrachloride, was added in substantially one portion after 10 minutes of polymerization. The polymerization was initiated at 70° C., peaked at 108° C. at about 2.5 minutes after initiation. The reaction mixture was stirred for 20 minutes additional at about 90° C. The polymer then was recovered as described for the runs above. Monomer conversion was 100 percent, but the Mooney viscosity of the recovered polymer was only 30 ML-4 at 212° F., as compared with values of 114 to 125 for the unextended polymers made by the procedure of the invention. The control polymer, designated Run B, thus obviously was not suitable for oil extension and processing evaluation of an oil extended polymer simply could not be accomplished.

For the combined runs of the invention (Run A), the compounding recipe employed is shown as follows:

| Compounding Recipe | |
|---|---|
| | Parts |
| Rubber[1] | 137.5 |
| Carbon Black[2] | 40 |
| Zinc Oxide | 3 |
| Stearic Acid | 2 |
| Santoflex AW[3] | 1 |

-continued

| Compounding Recipe | |
|---|---|
| | Parts |
| Sunoco 3425 Wax[4] | 2 |

[1]Extended with 37.5 phr highly aromatic oil of type 101 under ASTM D2226-63T.
[2]Type N 220 under ASTM D2516-66T.
[3]Condensation product of n-phenetidine and acetone.
[4]Paraffin wax processing oil, sp. gr. 0.906, m.p. about 128° F.

Further polymers were prepared employing a polymerization recipe as described below:

| Polymerization Recipe | |
|---|---|
| | Parts, by wt. or (mhm) |
| 1,3-Butadiene | 75 |
| Styrene | 25 |
| Cyclohexane | 760 |
| Tetrahydrofuran (THF) | 1.5 |
| n-Butyllithium, mhm | (0.55) |
| Silicon tetrachloride, mhm | (.145) |
| Temperature, °C[a] | 70 |
| Time, minutes[b] | 30 |

[a]Initiation temperature.
[b]Polymerization time only.
Charge Order:
Cyclohexane, N₂ purge, butadiene, styrene, THF, heat to 70° C, H-BuLi, polymerize 30 minutes, SiCl₄, react for 30 minutes.

The coupling agent, here silicon tetrachloride, was added as a single portion and only after essentially complete conversion of the monomers to polymer had been obtained. Five separate runs were made, with polymer from each recovered as described hereinabove. The five polymers thus prepared by employing terminal single-portion addition of coupling agent exhibited Mooney viscosity values ranging from 116 to 129 ML-4 at 212° F. These five polymers were oil extended, blended together, and then compounded in the recipe as described above for previous runs. The combined product was termed Run C. The Mooney ML-4 at 212° F. of the oil-extended polymer of Run C was 51. This control polymer Run C then was evaluated along with two other control polymers in a processing evaluation comparison with processing results as shown below;

Table II

| Polymer | Raw Mooney | Band/[a] Bank | Band Rating[b] 195°/158° F | Extrusion Garvey Rating[c] | at 250° F Feed Rating[d] |
|---|---|---|---|---|---|
| Run A — Invention | 55 | TR | 8/10 | 9 | 6 |
| Run C — Control | 51 | LT-RF | 2 LT/2 | 9 | 7 |
| Solution SBR[e]-Control | 46 | LT-F | 2 LT/4 | 8 | 8 |
| SBR-1712[f] | 47 | TR | 8/10 | 9- | 9 |

[a]Milling observations:
LT = loose on top; RF = rolling folding bank; F = folding bank; TR = tight band with rolling bank.
[b]Rating: 10 best.
[c]Rating: 12 best.
[d]Rating: 10 best.
[e]Commercially available solution polymerized butadiene/styrene 75/25 copolymer made with organolithium initiator and extended with 37.5 phr highly aromatic oil as indicated in the compounding recipe.
[f]Commercially available emulsion polymerized butadiene/styrene 75/12 copolymer prepared according to ASTM Method D-1419-61T.

These results clearly show that terminal addition of silicon tetrachloride in the preparation of the oil extended solution polymerized copolymers gave essentially no improvement in processing. The results shown hereinabove for Run A of the invention show the marked improvement of polymer processing achieved according to the invention. Comparison of Run A properties with the emulsion polymerized SBR show that it is now possible to produce, as I have discovered, solution polymerized polymers with properties equal to or better than the conventionally but more expensively and difficultly produced emulsion polymerized polymers.

EXAMPLE II

Random butadiene/styrene 75/25 copolymers were prepared by the continuous addition of initiator as well as the continuous addition of coupling agent, simultaneously. Such process produces polymers with broad molecular weight distributions and highly desirable processing characteristics.

| Polymerization Recipe | |
|---|---|
| | Parts |
| Butadiene | 75 |
| Styrene | 25 |
| Cyclohexane | 760 |
| Tetrahydrofuran | 1.5 |
| n-Butyllithium | Variable |
| Silicon Tetrachloride | Variable |
| Temperature, °F | Adiabatic |
| Time, minutes | Variable |

Solvent, monomer, and randomizing agent (THF) were charged to the reactor, the solution then heated to about 158° F. Small amounts of initiator were added in increments until the scavenger level was reached as indicated by a slight heat rise. Thereupon, addition of both n-butyllithium and silicon tetrachloride was commenced immediately and continued under adiabatic conditions for several minutes to insure quantitative conversion. The polymer solution was mixed with an isopropyl alcohol/toluene solution of an antioxidant 2,2-methylene-bis(4-methyl-7-tert-butylphenol) and steam stripped to remove solvent.

Test results on the polymers so prepared are as follows:

Table III

| | D | E | F | G |
|---|---|---|---|---|
| BuLi, part (mmoles) | 0.099 (1.55) | 0.096 (1.50) | 0.096 (1.50) | 0.096 (1.50) |
| SiCl₄, part (mmole) | 0.0626 (0.368) | 0.0605 (0.356) | 0.0605 (0.356) | 0.0605 (0.356) |
| Time of addn, minutes | 7.75 | 10.0 | 5.0 | 2.5 |
| Conv. at end of addn, % | — | 87 | 60 | 39[a] |
| Temperature, °F | | | | |
| initial | 161 | 165 | 162 | 164 |
| peak | 195 | 200 | 190 | 192 |
| Polymerization time, min. | 14 | 15 | 18.5 | 20 |
| Conversion, % | 100 | 100 | 100 | 100 |
| Inherent viscosity[b] | 1.75 | 2.22 | 1.97 | 2.31 |
| Mooney, ML-4[c] | 77.5 | 100 | 102 | 127 |
| Mooney Relaxation[d] | 0.15 | 0.21 | 0.17 | 0.22 |
| Mw × 10⁻³ / Mn × 10⁻³ | 268/143 | 367/164 | 321/194 | 397/190 |

Table III-continued

| | D | E | F | G |
|---|---|---|---|---|
| HI | 1.9 | 2.2 | 1.6 | 2.1 |

[a] Conversion at 3.0 minutes.
[b] Determined according to the procedure of U.S. 3,278,508, Col. 20, notes a and b.
[c] ASTM D 1646-63.
[d] Ratio of Mooney value obtained 30 sec. after rotor on machine is turned off to that value obtained at the instant the rotor is turned off after the normal 4 minute run time.
[e] Heterogeneity Index (HI) is defined as the ratio of the weight average molecular weight (Mw) to the number average molecular weight (Mn) as determined by gel permeation chromatography.

The addition simultaneously of both the initiator and the coupling agent would appear at first to be self-defeating since it would be expected that termination would occur almost before initiation could start. Nevertheless, the results above show desirable molecular weights, molecular weight distribution, desirable heterogeneity index (HI) values. A relatively high degree of branching in the polymer prepared by the invention is indicated by the Mooney relaxation values which are relatively high for butyllithium initiated polymers.

Polymers prepared according to the process of my invention show improved processability over those prepared according to the prior art. In particular, this improvement is seen in the milling of rubbery polymers at about 195° F., wherein the polymers of my invention show much better milling behavior than control polymers made according to the prior art. In addition, my polymers also exhibit significantly higher green strength compared to the polymers of the prior art. My polymers also exhibit low die swell and shrinkage on extrusion and these characteristics are valuable in applications which employ molding of the rubbery product. Another characteristic of the polymers of my invention, is the low viscosity of a hydrocarbon solution of polybutadiene such as a solution in styrene.

The polymers of this invention which are normally solid rubbery polymers can be compounded with conventional fillers, stabilizers, curatives, vulcanization accelerators, plasticizers, pigments, and the like which are conventionally employed in the rubber compounding art. These polymers can be used in applications where natural rubber and the synthetic rubber such as SBR have been employed heretofore such as in the manufacture of tires, tubing, belting, gaskets, hose and the like.

I claim:

1. In a process for the polymerization of at least one polymerizable monomer comprising a polymerizable conjugated diene, polymerizable monovinyl-substituted aromatic compound, or both, under polymerization conditions with an organolithium initiator, the improvement which comprises initiating the polymerization reaction with said organolithium initiator and adding said organolithium initiator in a continuous manner, further adding at least one nonpolymerizable silicon or tin coupling agent in a continuous manner commencing from a degree of conversion of about 3 percent up to about 75 percent, such that each of said organolithium initiator and said nonpolymerizable coupling agent is added essentially continuously simultaneously during at least a portion of the course of said polymerization.

2. The process according to claim 1 wherein said adding of said nonpolymerizable coupling agent extends up to about 75 percent conversion of said monomer.

3. The process according to claim 1 wherein said organolithium initiator and said nonpolymerizable coupling agent are each added essentially continuously over the course of the polymerization reaction.

4. A process according to claim 1 wherein said nonpolymerizable silicon or tin coupling agent is represented by the general formulae $R_aMZ_b$ or $R_cZ_dSi$—$SiZ_dR_c$ wherein each R is a hydrocarbyl radical of 1 to 20 carbon atoms per molecule or hydrogen; M is Si or Sn; Z is halogen, or —OR; b is an integer of 2 to 4, and a is 0, 1, or 2, such that a plus b is equal to 4; said halogen is fluorine, chlorine, bromine, or iodine; and c is 0, 1, or 2, and d is 1, 2, or 3, such that c plus d is equal to 3.

5. The process according to claim 1 wherein said coupling agent is a silicon tetrahalide or tetraalkyl orthosilicate.

6. In a process for the polymerization of at least one polymerizable monomer comprising a polymerizable conjugated diene, polymerizable monovinyl-substituted aromatic compound, or both, under polymerization conditions with an organolithium initiator, the improvement which comprises adding the said organolithium initiator essentially continuously to the polymerization reaction system and further adding to the polymerization reaction system at least one nonpolymerizable silicon or tin coupling agent essentially continuously during at least a portion of the course of said polymerization, wherein the addition of said nonpolymerizable coupling agent is commenced within about 3 percent up to about 75 percent monomer conversion and such that the addition of said organolithium initiator and said coupling agent are each conducted at least in part simultaneously with the other, thereby preparing a polymer of improved processability.

7. A process according to claim 6 wherein said polymerizable conjugated diene contains 4 to 12 carbon atoms per molecule, and said monovinyl-substituted aromatic compound contains 8 to 20 carbon atoms per molecule.

8. The process according to claim 6 wherein said adding of said nonpolymerizable coupling agent continues up to essentially complete monomer conversion.

9. The process according to claim 6 wherein said adding of said nonpolymerizable coupling agent extends up to about 75 percent conversion of said monomer.

10. The process according to claim 6 wherein said adding of said nonpolymerizable coupling agent extends from after about 3 percent conversion up to about 30 percent conversion of said monomers.

11. The process according to claim 6 wherein said adding of said nonpolymerizable coupling agent extends from about 3 percent conversion up to about 75 percent conversion.

12. The process according to claim 2 wherein said nonpolymerizable silicon or tin coupling agent is represented by the general formulae $R_aMZ_b$ or $R_cZ_dSi$—$SiZ_dR_c$ wherein each R is a hydrocarbyl radical of 1 to 20 carbon atoms per molecule or hydrogen; M is Si or Sn; Z is halogen, or —OR; b is an integer of 2 to 4, a is 0, 1, or 2, such that a plus b is equal to 4; said halogen is fluorine, chlorine, bromine, or iodine; c is 0, 1, or 2; d is 1, 2, or 3; such that c plus d is equal to 3.

13. The process according to claim 12 wherein is employed a ratio of equivalents of Z in said coupling agent to lithium in said organolithium initiator of about 0.01:1 to 1.5:1.

14. The process according to claim 13 wherein said organolithium initiator is employed in an amount sufficient to provide about 0.2 to 100 milliequivalents of lithium in said initiator per 100 grams of said polymerizable monomer employed.

15. The process according to claim 14 further employing a randomizer during said polymerization reaction, and said randomizer is a polar material and is an ether, thioether, tertiary amine, or alkali metal alkoxide.

16. The process according to claim 15 wherein said coupling agent is said $R_aMZ_b$.

17. The process according to claim 16 wherein said coupling agent is a silicon tetrahalide or tetraalkyl orthosilicate.

18. The process according to claim 17 wherein said coupling agent is a silicon tetrahalide.

19. The process according to claim 18 wherein said polymerizable monomer is a conjugated diene and is butadiene; said organolithium initiator is n-butyllithium; and said coupling agent is silicon tetrachloride.

20. The process according to claim 18 wherein said polymerizable monomer is butadiene and styrene, the resulting polymer is a butadiene/styrene copolymer, said organolithium initiator is n-butyllithium; and said coupling agent is silicon tetrachloride.

21. The process according to claim 18 further employing a randomizer wherein said randomizer is tetrahydrofuran, said polymerizable monomer is butadiene and styrene or is isoprene and styrene, said coupling agent is silicon tetrachloride, and said initiator is n-butyllithium or is a multilithium composition prepared from n-butyllithium and divinylbenzene.

22. The process according to claim 17 further employing a randomizer wherein said randomizer is tetrahydrofuran or potassium tert-amyloxide, said polymerizable monomer is butadiene and styrene or is isoprene and styrene, said coupling agent is silicon tetrachloride when said randomizer is tetrahydrofuran, or tetraethyl orthosilicate when said randomizer is potassium tert-amyloxide and said initiator is n-butyllithium or is a multilithium composition prepared from n-butyllithium and divinylbenzene.

23. In a process for the polymerization of at least one polymerizable monomer with an organolithium initiator, the improvement comprising initiating said polymerization with a minor portion of said organlithium initiator and continuing the addition thereof substantially continuously, adding to the polymerization reaction system commencing after at least about 3 percent monomer conversion up to about 75 percent conversion at least one nonpolymerizable coupling agent, simultaneously with the remainder of said organolithium initiator and essentially continuously during at least a portion of the remaining course of said polymerization, continuing said polymerization to substantially complete monomer conversion, and shortstopping said polymerization, wherein said polymerizable monomer is at least one polymerizable conjugated diene, at least one polymerizable monovinyl-substituted aromatic compound, or both, and wherein said nonpolymerizable couping agent is represented by the general formulae $R_aMZ_b$ or $R_cZ_dSi—SiZ_dR_c$ wherein each R is a hydrocarbyl radical of from 1 to 20 carbon atoms per molecule or hydrogen; M is Si or Sn; Z is halogen, or —OR; a is 0, 1, or 2, b is 2, 3, or 4, such that a plus b is equal to 4; said halogen is fluorine, chlorine, bromine, or iodine; c is 0, 1, or 2, d is 1, 2, or 3, such that c plus d is equal to 3.

24. In a process for the polymerization of at least one polymerizable monomer comprising a polymerizable conjugated diene, polymerizable monovinyl-substituted aromatic compound, or both, under polymerization conditions with an organolithium initiator, the improvement which comprises commencing polymerization with said initiator, adding both said organolithium initiator and at least one nonpolymerizable silicon or tin coupling agent simultaneously and at least in part essentially continuously during at least a portion of the course of said polymerization, thereby preparing a polymer of improved processability.

25. A polymerization process for the polymerization of at least one polymerizable monomer under polymerization conditions with an organolithium initiator, the steps comprising commencing polymerization of said monomer with an organolithium polymerization initiator wherein said organolithium polymerization initiator is added essentially continuously substantially over the course of the polymerization reaction, further adding essentially continuously and commencing substantially simultaneously with the initiator to the polymerization reaction commencing substantially with initiation at least one nonpolymerizable coupling agent essentially continuously during at least a portion of the course of said polymerization and at least in part simultaneously with said organolithium initiator, polymerizing to substantially complete monomer conversion, and shortstopping said polymerization, wherein said polymerizable monomer is at least one polymerizable conjugated diene, at least one polymerizable monovinyl-substituted aromatic compound, or both;

wherein said nonpolymerizable coupling agent can be represented by the general formulae $R_aMZ_b$ or $R_cZ_dSi—SiZ_dR_c$ wherein each R is a hydrocarbyl radical of from 1 to 20 carbon atoms per molecule or hydrogen; M is Si or Sn; Z is halogen, or —OR; a is 0, 1, or 2, b is 2, 3, or 4, such that a plus b is equal to 4; said halogen is fluorine, chlorine, bromine or iodine; c is 0, 1, or 2, d is 1, 2, or 3, such that c plus d is equal to 3.

26. In a process for the polymerization of at least one polymerizable monomer with an organolithium initiator, the improvement which comprises adding said organolithium initiator and simultaneously at least one nonpolymerizable coupling agent essentially continuously substantially during the course of said polymerization to substantially complete monomer conversion, and shortstopping said polymerization, wherein said polymerizable monomer is at least one polymerizable conjugated diene, at least one polymerizable monovinyl-substituted aromatic compound, or both;

wherein said nonpolymerizable coupling agent can be represented by the general formulae $R_aMZ_b$ or $R_cZ_dSi—SiZ_dR_c$ wherein each R is a hydrocarbyl radical of from 1 to 20 carbon atoms per molecule or hydrogen; M is Si or Sn; Z is halogen, or —OR; a is 0, 1, or 2, b is 2, 3, or 4, such that a plus b is equal to 4; said halogen is fluorine, chlorine, bromine, or iodine; c is 0, 1, or 2, d is 1, 2, or 3, such that c plus d is equal to 3.

* * * * *